May 4, 1954 V. H. BODLE ET AL 2,677,626
METHOD OF FORMING LUMPY DEPOSITS BY SPRAYING
Filed March 17, 1950 2 Sheets-Sheet 1

Inventors:
Virgil H. Bodle
George W. Blair and
Lucian P. Dosmann
By Eugene M. Giles Atty.

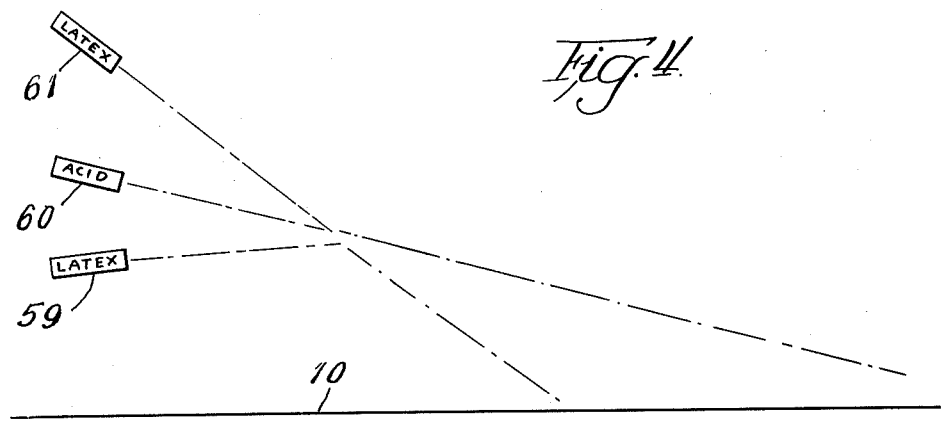
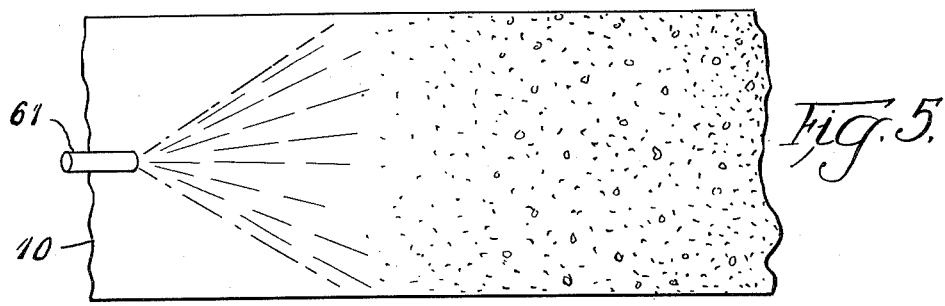
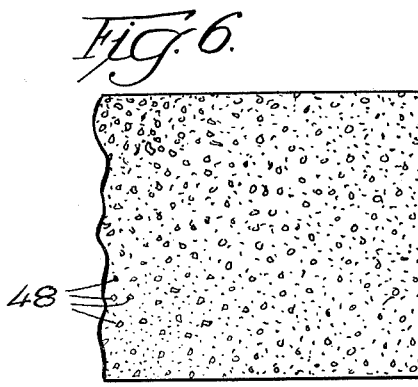
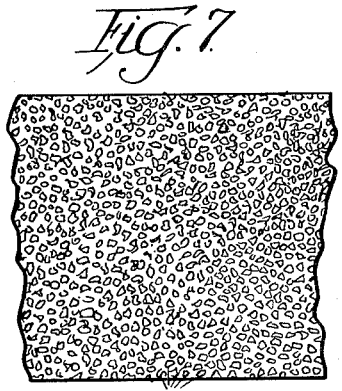
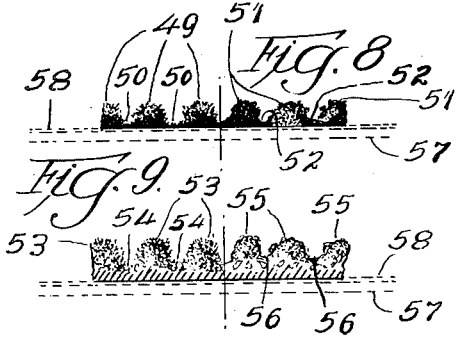

Patented May 4, 1954

2,677,626

UNITED STATES PATENT OFFICE 2,677,626

METHOD OF FORMING LUMPY DEPOSITS BY SPRAYING

Virgil H. Bodle, South Bend, and George W. Blair and Lucian P. Dosmann, Mishawaka, Ind., assignors to Mishawaka Rubber and Woolen Manufacturing Company, Mishawaka, Ind., a corporation of Indiana Application March 17, 1950, Serial No. 150,184

4 Claims. (Cl. 117—93)

Our invention relates to the production of surfacings or layers of material by spraying a coagulable dispersion of rubber or the like, and has reference more particularly to such surfacings or layers, and the method of and equipment for producing same, wherein the spray particles are deposited in a manner and in such volume to accumulate to a substantial depth and in individualized piles or lumps forming a contiguity of pronounced protuberances or lumps, this application being a continuation in part of our co-pending application Serial No. 550,964 (now Patent 2,501,839) filed August 24, 1944.

The principal objects of our invention are to provide a new and improved material from a spray of coagulable dispersion of rubber or the like, and an improved method of spraying and equipment by which the material may be readily and economically produced; to permit the production of surfacings and layers, from such dispersions, of substantial depth or thickness without repeated spray applications and intermediate drying or coagulation periods; to effect accumulation of the spray particles in clusters or piles of such size and individuality to form a continuity of pronounced protuberances or lumps; to permit the material to be made optionally as a surfacing attached to a backing or as an independent layer; to agglomerate the spray particles of each protuberance or lump in an integrated tough mass capable of withstanding hard wear; and to permit rapid and continuous production of the material, these and other objects being accomplished as pointed out hereinafter and as shown in the accompanying drawings, in which:

Fig. 1 is a top view showing somewhat diagrammatically a prefered form and arrangement of equipment for making sprayed material in accordance with our invention;

Fig. 2 is a view, partly in section, taken substantially on the line 2—2 of Fig. 1;

Fig. 3 is a view greatly enlarged, on the line 3—3 of Fig. 2 showing the paired latex and coagulant spray guns (one in section) which contribute principally to the building up of the pile or lump formations;

Fig. 4 is a side view showing diagrammatically another arrangement of equipment for producing the material of this invention;

Fig. 5 is a top view of the equipment illustrated in Fig. 4;

Fig. 6 is a top view of a section of sprayed surface in an initial stage of the spraying operation;

Fig. 7 is a view similar to Fig. 6 but showing the sprayed surface in a later stage of the spraying operation;

Fig. 8 is a fragmentary sectional view showing the manner in which the spray particles accumulate in piles or lumps; and Fig. 9 is a similar view showing an increase in the build up of the piles or lumps of Fig. 8.

Heretofore in producing materials from a sprayed dispersion of rubber or the like, it has been the practice either to deposit the spray particles in successive thin continuous films which collectively produce a solid deposit of the desired thickness, or to spray the dispersion in insufficient quantity to produce a continuous film, so that the particles are sparsely applied and produce a rough superficial surface the texture of which depends upon the spray particle size.

Generally the spray particles are deposited in uncoagulated state and dried or coagulated on the surface after deposit, although it has been suggested that they may be coagulated immediately before deposit.

Zimmerli and Semon Patent 1,841,076 is illustrative of the solid deposit practice and in their procedure the deposit is produced by successive applications of the dispersion spray which is exposed to a coagulant vapor or mist so that the particles coagulate after they reach the surface. Similarly in Galligan Patent 2,191,910 a continuous thin rubber film or solid rubber base layer is produced in a pattern form by alternate sprays of dispersion and coagulant so that relatively slow coagulation of the dispersion particles occurs on the sprayed surface.

Mayne Patent 2,056,406 is illustrative of the roughened surfacing applications, the dispersion spray being deposited in insufficient quantity to produce a continuous film and the particles being either deposited on previously applied coagulant or sprayed through a mist of coagulant so that they coagulate immediately upon deposit.

Similarly in Hansen Patent 2,120,406, Diller Patent 2,306,937 and Schwartz Patent 2,184,153 the dispersion particles are applied so as to produce a non-continuous film and the particles are coagulated after deposit. In the above mentioned Galligan patent, in which a rough surfacing is produced on his solid rubber base, by spraying a discontinuous film of dispersion particles thereon, it is suggested that these particles constituting the discontinuous film may be coagulated either before or after deposit.

We have found that by simultaneously or conjointly depositing a combination or mixture of coagulated and uncoagulated spray particles a greatly increased spray volume may be employed and an integrated deposit of substantially any desired depth or thickness may be produced progressively without intermediate drying or coagulation periods.

We have found further that by properly proportioning the coagulated and uncoagulated spray particles, the deposit may be built up to the desired depth in sufficiently separated or individualized piles to provide a surfacing or layer in the form of a contiguity of pronounced protuberances or lumps.

These protuberances or lumps may be more or less individualized, as for example either substantially completely individualized or interconnected a substantial distance upwardly from the bottom, both as shown in our aforesaid application Serial No. 550,964 and they may be of elongated finger-like form as illustrated particularly in our said application or of more squatty and less finger-like form, as shown herein, depending on the volume of the dispersion sprayed on a given area and the proportion employed of coagulated to uncoagulated particles.

Moreover the places of build up in the individualized piles may be predetermined by spraying on a surface, such as illustrated in our aforesaid application, having embossments upon which the build up is substantially localized, or the build up may be caused to occur at random locations, as hereinafter more fully explained, by appropriate spray technique, on a smooth surface.

Furthermore, with our method, the texture of the spray formed projections or lumps may be varied and the particles of which they are formed may be accumulated and integrated in relatively solid masses of such toughness that the material is capable of withstanding hard wear and is suitable for such purpose as carpeting, automobile floor mats and even shoe soles.

Fine particles alone may be employed to build up the more or less individualized finger-like piles or lumps of our invention, but it is desirable to employ a spray wherein a considerable proportion of the deposited particles are of larger size.

This is advantageous, not only because the larger size particles build up more rapidly in the finger or lump-like piles and tend to compact the deposit, but it is particularly important in depositing on a plane surface as it provides an initial deposit of separate masses of such size that subsequently deposited particles tend to accumulate and pile up thereon and thus the initiation of the separate piles is facilitated.

This tendency of the particles to accumulate and build up in individualized piles is believed to be due to electrostatic action, the spray particles becoming electrified or charged, and collectively inducing an opposite potential in the underlying base which localizes in the highest places of or on the base and attracts the charged dispersion particles thereto.

Such individualized piling up of the particles occurs in normal spraying of the rubber dispersion, without specially or actively contributing an electrical charge thereto, if the coagulated particles are suitably proportioned to the uncoagulated particles to promote such piling up, but is accentuated and can be effected more rapidly and with larger particles if the particles are sprayed in an electrostatic field as hereinafter explained, from which it is assumed that the piling up, in any event, is due to electrostatic action and that the sprayed particles normally tend to accumulate some charge, perhaps by friction in the air.

In practicing our invention we have found it advantageous to employ equipment, such as shown somewhat diagrammatically in Figs. 1 and 2, wherein a pair of spray guns are arranged to produce a combined rubber dispersion and coagulant spray which deposits on the surface on which the sprayed surfacing or layer is to be produced, and wherein another single spray gun is arranged to spray rubber dispersion only on the deposited combined dispersion and coagulant spray from the pair of spray guns.

In said Figs. 1 and 2, the reference numeral 10 indicates a conveyor belt on the horizontal upper length of which the spray is deposited or upon which a sheet of material or separate sections of sheet material are advanced through the spraying zone. This conveyor belt is of a width corresponding to the desired width of material to be made thereon, for example 60 inches in the present set up, and is trained around rollers or drums 11 and 12, to one of which power is applied from a suitable source to operate the belt in the direction indicated by the arrows at a speed generally between three and four feet per minute, and preferably closer to three feet per minute.

A metal plate 13 underlies and supports the upper length of the belt 10 throughout the area of the spray zone and is grounded as indicated at 14 for a purpose hereinafter explained.

Above the belt 10 at the forward end of the metal plate 14 is located a pair of spray guns (see Fig. 3), one of which, indicated at 15 supplies a spray of the rubber dispersion and the other of which, indicated at 16 supplies a spray of liquid coagulant.

Each of the nozzles 15 and 16 has a short laterally extending mounting arm 17 pivoted by means of a bolt 18 to a connector block 19 which is horizontally pivoted to the lower end of a hanger 20 by means of a bolt 21 which extends at right angles to the bolt 18.

The hanger 20 depends from a wheeled carriage or trolley 121 which operates on an overhead track 22 which extends transversely of the belt 10 from side to side.

Thus the spray guns 15 and 16 are movable conjointly to and fro across the belt width and are conjointly adjustable on the bolt connection 21 to any desired angle relatively to the belt 10 and each nozzle is individually adjustable on the bolt 8 to any desired angle relatively to the belt length and to one another.

These spray guns 15 and 16 are located approximately 36 inches above the upper length of the belt 10 and are conjointly tipped downwardly at an angle of approximately 50° to the surface of the belt and are adjusted angularly with respect to one another and to the belt length so that the sprays therefrom meet a short distance from the guns and produce a combined dispersion and coagulant spray in a plane lengthwise of the belt. Because the volume and force of the dispersion spray is substantially greater than that of the coagulant spray, the direction of the combined spray is determined principally by the dispersion spray and accordingly the coagulant gun 16 is at a much greater sidewise angle to the direction of movement of the belt than the dispersion gun 15.

Any conventional spray guns of appropriate volume and control of the spray constituents may be employed; those shown herein, like those of our aforesaid application Serial No. 550,964, being made by Paasche Spray Equipment Company of Chicago, Illinois, although we have used and found spray guns made by Binks Manufacturing Company of Chicago, Illinois, produce equally satisfactory results. Spray guns having valves which permit adjustment of the size of the spray orifice and the air volume have been found advantageous, as they permit regulation of the quantity and character of the spray.

The guns 15 and 16 are alike, except as to spray capacity and each comprises a body having two ports 23 and 24 leading therethrough, the port 23 leading to the chamber 25 of a cap 26 which is threaded onto the body and the port 24 leading to a nozzle 27 which is also threaded onto the body and projects centrally through the chamber 25 of the cap 26.

The nozzle body has a flexible hose 28 connected thereto at the outer end of the port 23 and leading from a source of compressed air to supply air under pressure to the chamber 25 and the latter has an outlet 29 therefrom which surrounds the tip of the nozzle 27 so that compressed air discharges therefrom in a nozzle tip encircling stream.

Each nozzle body also has another flexible hose connected thereto at the outer end of the port 24 to supply the liquid which is to be sprayed through the nozzle 27, such flexible hose for the spray gun 15 being indicated at 30 and connected to a source of supply of compounded rubber dispersion such as rubber latex and such flexible hose for the spray gun 16 being indicated at 31 and connected to a source of supply of a liquid coagulant.

The cap 26 of each spray gun has a pair of lugs 32 projecting therefrom at diametrically opposite sides of the air discharge opening 29 and each lug 32 has a port 33 leading therethrough from the air chamber 25 to an outlet 34 which discharges inwardly toward the combined compressed air and liquid discharge from the outlet 29 and nozzle 27 to flatten the spray discharge into a flat fan shaped spray 35.

The guns 15 and 16 are arranged so that the lugs 32 of each are at opposite sides of a vertical plane so as to flatten the spray from each gun into a fan shaped spray lying in a vertical plane and the combined dispersion and coagulant spray beyond the juncture of the sprays from the two guns is likewise a flat fan shaped spray in a vertical plane and sprays only a narrow width of the belt 10 but throughout a substantial length thereof, for example approximately 18 inches, substantially as indicated by the dotted lines at 36 in Fig. 1.

By moving the spray guns 15 and 16 back and forth along the track 22 at proper speed the spray 35 is caused to cover the entire width of the belt 10 or such portion of the width as it is desired to cover with the spray.

Beyond the spray guns 15 and 16 toward the discharge end of the belt 10 is another spray gun 37 directed straight down toward the belt 10 and suspended from a carriage 38 which operates along an overhead track 39 which, like the track 22 extends from side to side of the belt 10, said gun 37 being located about fifty inches from the guns 15 and 16 and about thirty inches above the belt 10.

This gun 37 is like the guns 15 and 16 in construction and has the ears 32 thereof (see Fig. 3) arranged to flatten the spray 40 therefrom into a flat fan shape in a vertical plane extending lengthwise of the belt and accordingly sprays only a narrow width of the belt 10, but throughout a considerable length thereof, for example approximately ten to twenty-four inches, as indicated at 41 in Fig. 1.

Like the guns 15 and 16, this gun 37 is moved back and forth across the belt 10 to cover the width thereof, and this back and forth movement to this gun, and to the guns 15 and 16 may be imparted manually or by power.

The gun 37 sprays the dispersion only, without coagulant, and like the gun 15 has a flexible hose connected thereto and leading from a source of compounded rubber dispersion which is discharged through the gun nozzle and another flexible hose connected thereto and leading from a source of compressed air to supply air under pressure for discharge through the cap of the gun around the tip of the nozzle in the same manner as in the nozzles 15 and 16 of Fig. 3.

In order to avoid wastage of the sprayed material due to overspray beyond the margins of the conveyor belt 10, and also to insure uniformity of spray application across the width of the conveyor belt, we provide a pair of corresponding long electrodes 42 which extend along the respective lateral margins of the belt 10 throughout the length of the spray zone as shown in Figs. 1 and 2. Each electrode 42 comprises an elongated wire frame of electrically conductive wire, substantially as described in the co-pending sole application of Lucian P. Dosmann, Serial No. 41,528 (now Patent 2,595,342) filed January 30, 1948, and said frames are connected by spaced cross wires 43, the number and location of which regulates longitudinal drift of spray mist. These electrodes 42 are connected as indicated at 44 to the negative pole of a high potential direct current generator 45, the other positive pole of which is grounded as indicated at 46 and as the underlying plate 13 is also grounded at 14 as above mentioned, a positive charge is communicable to the plate 13 from the generator.

Thus, when the generator 45 is in operation a negative field is created and maintained over the belt between the electrodes and a corresponding positive charge is accumulated in the plate. This negative field contributes a negative charge to the spray particles so that the negatively charged electrodes 42 impose a barrier effect thereon to confine and deposit the spray particles within the width of the belt 10, and thus avoid overspray and wastage, and it also causes the negatively charged spray particles to be attracted to the belt by the positively charged plate 13 thereunder. The positive charge of the plate imparts or causes a positive polarity to exist in the upper surface of the belt 10 or the upper surface of any layers or deposit on the belt which polarity apparently tends to localize in any elevated or raised places on the surface of the belt, or of any layers or deposit thereon and presents greatest attraction for the negatively charged particles at these elevated or raised places.

For an appropriate and typical spraying operation with the above equipment, the gun 15 is provided with a nozzle 27 having a discharge opening of 0.70 inch diameter and area of 2.47 sq. mm. and the dispersion is supplied to this nozzle through the hose 30 under a pressure of 10 lbs. per square inch. The opening 29 around the nozzle tip is of a rated capacity of 10.4 cubic feet of air at 50 lbs. pressure and the pressure of the air supply through the hose 28 is 35 pounds per square inch. Under these conditions the spray gun 15 will spray from 900 to 1000 cc. of dispersion per minute.

The coagulant gun 16 is provided with a nozzle 27 having a discharge opening of .052 inch diameter and area of 1.37 sq. mm. and the coagulant is supplied to this nozzle through the hose 31 under a pressure of 3 pounds per square inch. The opening 29 around the nozzle 27 of the coagulant gun 16 is of a rated capacity of 15.1 cubic feet of air at 50 lbs. pressure and the pressure of air supply through the hose 28 of the gun 16 is the same as that supplied through the hose 28 of the dispersion gun 15, namely 35 lbs. per sq. inch. Under these conditions the spray gun 16 will spray approximately 300 cc. of coagulant per minute.

The vertical gun 37 is provided with a nozzle 27 having a discharge opening of .086 inch and area of 3.75 sq. mm. and the dispersion is supplied to this nozzle under a pressure of 10 to 15 lbs. The opening 29 around the nozzle 27 of said gun 37 is of a rated capacity of 15.1 cubic feet of air at 50 pounds pressure and the pressure of air supply to the chamber 25 of said gun 37 and the opening 29 thereof is 60 pounds per square inch. Under these conditions, the spray gun 37 will spray approximately 1200 cc. of dispersion per minute at 10 lbs. dispersion pressure, whereas at 15 lbs. dispersion pressure the deposit is about 1800 cc. per minute.

A rubber dispersion such as disclosed in our application Serial No. 550,964 may be employed for both guns 15 and 37, but we prefer with the electrode spray control to employ a compound less conducive to build up on the electrodes.

Such preferred dispersion is composed of the following:

|  | Dry weight |
| --- | --- |
| Malayan latex | 100.0 |
| Potassium oleate | 0.5 |
| Potassium oleate | 0.3 |
| Formaldehyde (quantity necessary to reduce $NH_3$ to 0.2% on dry rubber). | |
| Potassium hydroxide | 0.1 |
| Castor oil soap | 1.0 |
| Sulfur | 1.5 |
| Zinc oxide | 3.0 |
| Zinc salt of 2-mercaptobenzothiazole | 2.0 |
| "Aminox" (a low temperature reaction product of diphenylamine and acetone) | 0.3 |
| Colors and loading | 20.0 |
| | 128.7 |

In preparing this dispersion, the 0.5 part by weight of potassium oleate is added to the latex and stirred. The formaldehyde, potassium hydroxide, and 0.3 part by weight of potassium oleate are then added to the latex mixture. Thereafter, the balance of the materials are added in the order in which they are shown.

The castor oil soap referred to in the above formula is composed of the following:

|  | Net weight |
| --- | --- |
| Castor oil | 29.7 |
| 40% potassium hydroxide | 13.25 |
| Water | 58.05 |
| | 100.00 |

The castor oil is heated to 210°–220° F. and the 40% potassium hydroxide is added slowly, thereto. The water is then added and the mixture is stirred until free of lumps.

Any suitable coagulant may be employed in the gun 16, such as acetic or formic acid. We prefer to use acetic acid having a 20 per cent concentration and this is supplied to the gun 16 at a pressure of 3 lbs. as aforesaid.

The spray from the guns 15, 16 and 37 may be deposited directly on the belt 10 to produce a layer of material composed entirely of the spray particles, and which is subsequently stripped from the belt or it may be deposited as a surfacing on either a sheet material such as indicated by dotted lines at 47 in Fig. 1 which is supported on and conveyed by the belt 10 continuously through the spraying, or on separate pieces of sections of sheet material which are laid on the conveyer belt for conveyance through the spraying zone.

If the spray is deposited directly on the belt and subsequently stripped therefrom, we have found it desirable to lubricate the surface of the belt with a soap solution prior to the deposit of the spray thereon to facilitate the stripping of the completed layer from the belt. A design, such as ribs, projections or indentations may be imparted to the underside of the layer deposited thereon by engraving or embossing the reverse of such design on the belt 10, in which event it is especially important to apply the soap solution to the belt surface before spraying thereon.

When the dispersion is to be sprayed as a surfacing on a backing or base, such as the sheet material 47 of Fig. 2, or on separate pieces of backing material, such as sheets or pieces of rubber, fabric, cardboard, fibrous composition or the like, it is preferable to precoat the surface thereof, on which the spray is to be deposited, with an adhesive, such as a rubber cement, to insure positive and permanent bonding of the sprayed surfacing thereto.

The surface of the material upon which the spray is deposited may be embossed or otherwise provided with slight projections or elevations, as shown more particularly in our aforesaid application Serial No. 550,964, to predetermine the places where the sprayed deposit builds up in the individualized piles, although such embossments are not necessary with a spraying set up such as explained above, as the spray from the gun 15 deposits a sufficient scattering of relatively large droplets to initiate pile-up in localized places and produce a random arrangement of closely adjoining individualized piles.

With the gun openings and pressures above indicated for the guns, the sprayed dispersion particles appear to be generally of a very small size ranging in diameter from about .00015" to about .00930", but it appears that in the travel of the particles from the spray gun to the place of deposit some of these particles accumulate into larger masses, this being due to and in proportion to the volume of the spray which produces such profusion of spray particles that some of them crowd together and combine into larger droplets before deposit.

In any event, with the equipment above described, larger droplets are produced which provide deposits of approximate diameter from .020" to .035", and those from the spray gun 15 are initially scattered indiscriminately on the deposit surface in sufficient quantity to initiate the build up of subsequent deposits in close adjoining random arranged individualized piles. Subsequently deposited layer droplets accumulate generally in the thus initiated piles, those which are coagulated or largely coagulated contributing to depth of build up and those which are uncoagulated seem to fill in between and around and knit the coagulated particles together into a stable relatively solid mass and all of such subsequent large droplets tending by their size and impact to compact and contribute density to the individualized piles.

In this spraying operation, as the spray deposit is initiated, both coagulated and uncoagulated particles are deposited in fine particle and large droplets, the large droplets being scattered upon the surface, as indicated at 48 in Fig. 6, among a profusion of fine particles and, as the spraying proceeds, the additional scattering of larger droplets increases the proximity of larger droplets to one another, and the particles and droplets begin to pile up in the individualized piles, generally in the locations determined by the initial larger droplet deposits 48, until close adjoining individualized piles are started throughout the sprayed surface, the proportion of uncoagulated particles deposited from the combined spray guns 15 and 16 being such as to knit together the coagulated particles and promote build up thereof to substantial height in individualized piles as the spraying proceeds.

In this initial build up of the individualized piles it is important to have a proper ratio of coagulated and uncoagulated particles, inasmuch as lack of a sufficient proportion of uncoagulated particles results in an unstable mass and uncertain pile up, whereas an excess proportion of uncoagulated latex prevents piling up of the coagulated particles or floods out any formations which tend to accumulate or pile up.

With the above described set up, a suitable ratio of coagulated and uncoagulated particles is deposited by the guns 15 and 16 so that the particles pile up readily in individualized piles somewhat as shown at 49 in Fig. 8 and in random close adjoining distributed relation as indicated at 49 in Fig. 7, with a slight interconnection at the base as indicated at 50, these piles 49 being substantial in character but superficially somewhat shaggy and of a loose texture capable of accommodating substantial additional quantities of uncoagulated dispersion.

Thereafter, as the deposit advances with the conveyor belt 10 these individual piles 49 formed by the coagulant and dispersion mixture from the guns 15 and 16 come within the zone of the dispersion spray from the vertical gun 37, which as above explained deposits dispersion spray only, and this spray of uncoagulated particles fills in further between and around the particles of the piles 49 and on the surface thereof so that those piles 49 become tough and durable lumps of relatively solid texture, as indicated at 51 in Fig. 8, with the previous shaggy exterior more or less filled in to produce a surface on each pile or lump which is still rough and irregular but characterized by small blob-like lumps.

This dispersion spray from the gun 37 also fills in around and between the particles of the interconnecting deposit 50 at the bases of the piles to give greater solidity and depth thereto as indicated at 52 in Fig. 8.

Generally the deposit from the vertical gun 37 does not materially increase the buildup of the piles 49 but is absorbed within and on the surface of the piles 49 to increase the solidity and strength thereof.

As above mentioned, an increasingly greater amount of uncoagulated dispersion can be accommodated as the piles 49 are built up and the set up shown in Figs. 1 and 2 is advantageous as it permits adjustment of the final application of uncoagulated particles to the particular volume that can be accommodated by or is desired for the texture and surfacing of the piles. Moreover, build up between the piles depends largely upon the relative volume of uncoagulated particles deposited and by adjusting the volume of the spray from the gun 37 a deposit of greater or lesser depth at 52 between the piles may be obtained.

In the above described spraying operation, the ratio of coagulant to dispersion is about 1 to 9 and with the gun arrangement and spray distance recommended above the ratio of coagulated to uncoagulated particles as they are deposited appears to be about 1 to 5.

Obviously the ratio of coagulated to uncoagulated particles depends upon the particular dispersion compound employed, the strength and relative quantity of the coagulant, the size of the spray particles, the distance, direction and force of the spray and the manner of exposure of the dispersion to the coagulant. For example, by atomizing the dispersion to an extremely fine spray we have employed a front gun dispersion discharge of 6000 cc. per minute with the 300 cc. per minute of coagulant.

Generally, individualized formations may be produced with a ratio of coagulant to dispersion as low as 1 to 1 and as high as 1 to 25 and with a ratio of coagulated particles to uncoagulated particles as low as 1 to 2 and as high as 1 to 6. The particles which produce the build up may not be completely coagulated but are sufficiently coagulated so they are sufficiently set to accumulate in piles and do not accumulate as liquid.

With the above described set up, the nozzles 15, 16 and 37 are moved back and forth across the top of the conveyor during the spraying operation so as to distribute the deposit evenly across the width of the belt, and when thus operated across the five foot width of the belt 10 at the above indicated preferred belt spread they deposit about 140 cc. of dispersion per square foot, which produces a deposit of approximately ⅛ inch over all depth which is generally sufficient for many purposes, especially coatings for trimstock for automobiles and the like. For such single pass operation we generally use a dispersion pressure of about 10 lbs. at the nozzle 37 and the volume of dispersion supplied therefor is about 2200 cc. per minute.

For thicker stocks, such as carpeting or automobile mats, the volume of the spray may be increased but we have found it advantageous to effect such increase by two passes through the spraying zone. Because a greater volume of dispersion may be accommodated as the piles build up, we prefer on the second pass to increase the dispersion pressure of the nozzle 37 to 15 lbs. which increases the volume of dispersion discharge to about 2800 cc. per minute.

Thus the material represented in Fig. 8, which is produced in a single pass through the spraying zone on the conveyor 10, is passed again therethrough and thereby the formations 51 on the Fig. 8 material are built up to an increased height substantially as shown in Fig. 9.

In this second pass the mixed coagulated and uncoagulated particles from the gun 15 pile up on top of the already produced piles 51 in somewhat scraggly loose textured accumulations as represented at 53 in Fig. 9 with some increase in the interconnections between the piles, as indicated at 54 after which the dispersion from the gun 37 fills in on and between the particles of the additionally piled up masses 53 and in and on the particles of the additional interconnecting deposit 54 and imparts a solidity of texture and surfacing to the added deposit like that of the original piles 51.

In this second pass the deposit accumulates to an overall depth of approximately one quarter of an inch and the material resembles and may be used like a pile carpeting.

The material of Fig. 8 or the two pass material of Fig. 9 may be deposited on the belt surface and stripped therefrom, or may be deposited on a backing, which is indicated by dotted lines at 57 in Figs. 8 and 9, the backing being preferably coated with a cement as indicated at 58 before the deposit is applied therein.

The deposited dispersion is compounded with vulcanizing ingredients and after the spraying operation is completed it is vulcanized.

An alternative form of spraying equipment is represented in Figs. 4 and 5 in which three fixed guns 59, 60 and 61 are located in superposed relation above the belt 10 midway between the length thereof. These guns are similar to the guns 15, 16 and 37, the upper and lower guns being supplied with the dispersion compound and air under pressure to spray dispersion only, and the middle gun 60 being supplied with coagulant and compressed air to spray coagulant only.

All of these guns 59, 60 and 61 are provided with spray flattening facilities, like the lugs 32 and ports 33 and outlets 34 of the previously described guns, but arranged above and below the spray discharge to flatten the spray into fan shape spreading widthwise of the belt, the guns 59, 60 and 61 being arranged so as to converge and met at a distance therefrom, as indicated in Fig. 4 and produce a composite spray which fans out across the belt to substantially the same width as the belt at the place where the spray deposits thereon.

In this set up, the upper dispersion gun 61 is located at an elevation of about 21 inches above the belt and tipped down at an angle of about 30°, or in some cases as much as 60°, to the plane of the belt, and the coagulant gun 60 is located about 13 or 14 inches above the belt and tipped down at an angle of about 15° to the plane of the belt while the lower dispersion gun is located about 9 inches above the belt and tipped up slightly, about 5°, to the plane of the belt.

Substantially the same total deposit of dispersion is employed in the above described set up of Figs. 4 and 5 as in the set up of Figs. 1 and 2 and substantially the same ratio of coagulant to total dispersion is employed, this total dispersion being proportioned between the upper and lower guns 61 and 59 to accomplish the same character of build up and solidification of the individualized piles as produced by the set up of Figs. 1 and 2.

Generally the dispersion from the upper gun 61 supplies the uncoagulated particles which accomplish the eventual filling in and solidification of the piles which is effected largely by the vertical gun 37 of the Figs. 1 and 2 set up and supplies a greater volume of dispersion than the lower gun 59.

Preferably electrostatic control, corresponding to the electrodes 42 and cross wires 43 of Figs. 1 and 2, is employed in conjunction with the set up of Figs. 4 and 5 to avoid overspray at the margins of the belt and to facilitate localized deposit.

This set up of Figs. 4 and 5 provides a width of spray which extends across and covers the width of the belt without the necessity of moving the spray guns back and forth across the belt, but does not give as great uniformity of spray throughout the width of the belt as may be obtained with the movable guns of Figs. 1 and 2. For surfacing pieces of backing material, such non-uniformity is not objectionable.

In spraying with either set up on pieces of backing materials, selected portions only of the surfaces of the pieces may be surfaced by overlapping the pieces so that portions of the surfaces are masked out.

In the spraying operations above described, the dispersion deposits in pronounced more or less finger-like piles or lumps, which however are sufficiently interconnected with one another throughout the area of the material to constitute a continuity of piles or lumps.

It is to be understood that while we have specified a particular latex compound that may be used in the spraying operation, our invention contemplates not only natural latex but also dispersions of synthetic rubber or of any other similar elastic materials that may be employed for the purpose, all of which are contemplated in the term rubber as used in the claims hereof.

While we have shown and described our invention in a preferred form, we are aware that various changes and modifications may be made therein without departing from the spirit of our invention, the scope of which is to be determined by the appended claims.

What is claimed:

1. The method of making a lumpy layer of elastic material with pronounced lump-like formations substantially individualized and proximately arranged throughout the area thereof, which said method comprises providing a surface, on which the layer is to be made, with initial elevations at the respective places where the lump-like formations are to be produced thereon and thereafter depositing on said surface a relatively small quantity of stable particles of a coagulable liquid dispersion of rubber together with a substantially larger quantity of unstable particles thereof, the amount of which unstable particles is sufficient for complete coverage of said surface to a substantial depth, and includes the steps of spraying the coagulable liquid dispersion of rubber in finely divided particles to provide the particles which are deposited on said surface as aforesaid, depositing those sprayed particles which compose the aforesaid substantially larger quantity on said surface before coagulation thereof, separately spraying and commingling with the spray of coagulable liquid dispersion particles while the latter are in transit to said surface, finely divided particles of a coagulant which coagulates those sprayed particles which compose the aforesaid small quantity of stable particles before deposit thereof on said surface, piling up the coagulated particles locally on the respective aforesaid initial elevations of said surface in superposed relation to one another in pronounced substantially individualized piles, and as said coagulated particles are accumulating in said piles, progressively accumulating therewith and retaining locally on and in said piles the said uncoagulated particles.

2. The method of making a lumpy layer of elastic material with pronounced substantially solid lump-like formations substantially individualized and proximately arranged throughout the area thereof, which said method comprises providing a surface, on which the layer is to be made, with initial elevations at the respective places where the lump-like formations are to be produced thereon and thereafter depositing on said surface a relatively small quantity of stable particles of a coagulable liquid dispersion of rubber together with a substantially larger quantity of unstable particles thereof, the amount of which unstable particles is sufficient for complete coverage of said surface to a substantial depth and includes the steps of spraying the coagulable dispersion of rubber in finely divided particles to provide the particles which are deposited on said surface as aforesaid, depositing those sprayed particles which compose the aforesaid substantially larger quantity on said surface before coagulation thereof, separately spraying and commingling with the spray of coagulable liquid dispersion particles while the latter are in transit to said surface, finely divided particles of a coagulant which coagulates those sprayed particles which compose the aforesaid small quantity of stable particles before deposit thereof on said surface, piling up the coagulated particles locally on the respective aforesaid initial elevations of said surface in superposed relation to one another in pronounced substantially individualized piles, and as said coagulated particles are accumulating in said piles, progressively accumulating therewith and retaining locally on and in said piles the said uncoagulated particles and progressively combining said uncoagulated particles with the coagulated particles in a relatively solid lump-like mass.

3. The method of making a lumpy layer of elastic material with pronounced substantially solid lump-like formations substantially individualized and proximately arranged throughout the area thereof, which said method comprises providing a surface, on which the layer is to be made, with initial elevations at the respective places where the lump-like formations are to be produced thereon and thereafter depositing on said surface a relatively small quantity of stable particles of a coagulable liquid dispersion of rubber together with a substantially larger quantity of unstable particles thereof, the amount of which unstable particles is sufficient for complete coverage of said surface to a substantial depth and includes the steps of spraying the coagulable liquid dispersion of rubber in finely divided particles to provide the particles which are deposited on said surface as aforesaid, depositing those sprayed particles which compose the aforesaid substantially larger quantity on said surface before coagulation thereof, separately spraying and commingling with the spray of coagulable liquid dispersion particles while the latter are in transit to said surface, finely divided particles of a coagulant which coagulates those sprayed particles which compose the aforesaid small quantity of stable particles before deposit thereof on said surface, piling up the coagulated particles locally on the respective aforesaid initial elevations of said surface in superposed relation to one another in pronounced substantially individualized piles, and as said coagulated particles are accumulating in said piles, progressively accumulating therewith and retaining locally on and in said piles the said uncoagulated particles and progressively combining said uncoagulated particles with the coagulated particles, and finally depositing on said piles and accumulating thereon in integral relation therewith uncoagulated particles of another separately sprayed coagulable liquid dispersion of rubber.

4. The method of making a lumpy layer of elastic material with pronounced substantially solid lump-like formations substantially individualized and proximately arranged throughout the area thereof, which said method comprises providing a surface, on which the layer is to be made, with initial elevations at the respective places where the lump-like formations are to be produced thereon and thereafter depositing on said surface a relatively small quantity of stable particles of a coagulable liquid dispersion of rubber together with a substantially larger quantity of unstable particles thereof, the amount of which unstable particles is sufficient for complete coverage of said surface to a substantial depth, and includes the steps of spraying the coagulable liquid dispersion of rubber in finely divided particles through an electrical field of given polarity to provide and electrically charge the particles which are deposited on said surface as aforesaid, imparting an electrical charge of opposite polarity to said surface, depositing those sprayed particles which compose the aforesaid substantially larger quantity on said surface before coagulation thereof, separately spraying and commingling with the spray of coagulable liquid dispersion particles while the latter are in transit to said surface, finely divided particles of a coagulant which coagulates those sprayed particles which compose the aforesaid small quantity of stable particles before deposit thereof on said surface, piling up the coagulated particles locally on the respective aforesaid initial elevations of said surface in superposed relation to one another in pronounced substantially individualized piles, and as said coagulated particles are accumulating in said piles, progressively accumulating therewith and retaining locally on and in said piles the said uncoagulated particles and progressively combining said uncoagulated particles with the coagulated particles in a relatively solid lump-like mass.

References Cited in the file of this patent

UNITED STATES PATENTS

| Number | Name | Date |
|---|---|---|
| 2,056,406 | Mayne | Oct. 6, 1936 |
| 2,120,406 | Hansen | June 14, 1938 |
| 2,155,441 | Osborne | Apr. 25, 1939 |
| 2,184,153 | Schwartz | Dec. 19, 1939 |
| 2,249,205 | Hansen | July 15, 1941 |
| 2,335,116 | Hansen | Nov. 23, 1943 |
| 2,421,787 | Helmuth | June 10, 1947 |
| 2,501,839 | Bodle et al. | Mar. 28, 1950 |
| 2,502,445 | Fash | Apr. 4, 1950 |
| 2,595,342 | Dossmann | May 6, 1952 |

FOREIGN PATENTS

| Number | Country | Date |
|---|---|---|
| 795,338 | Great Britain | Mar. 11, 1936 |